United States Patent
Wang et al.

(10) Patent No.: US 10,129,767 B2
(45) Date of Patent: Nov. 13, 2018

(54) FRAMEWORK FOR INTELLIGENT DIAGNOSTIC DATA COLLECTION

(71) Applicant: Samsung Electronics Co., Ltd, Suwon-si (KR)

(72) Inventors: Yu Wang, Mountain View, CA (US); Pei Zheng, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 15/236,301

(22) Filed: Aug. 12, 2016

(65) Prior Publication Data
US 2018/0049045 A1     Feb. 15, 2018

(51) Int. Cl.
| H04W 24/02 | (2009.01) |
| H04L 12/26 | (2006.01) |
| G06N 99/00 | (2010.01) |
| H04W 24/04 | (2009.01) |

(52) U.S. Cl.
CPC .......... *H04W 24/02* (2013.01); *G06N 99/005* (2013.01); *H04L 43/04* (2013.01); *H04W 24/04* (2013.01)

(58) Field of Classification Search
CPC ...... H04W 24/02; H04L 43/04; G06N 99/005
See application file for complete search history.

(56) References Cited

U.S. PATENT DOCUMENTS

| 5,732,708 A * | 3/1998 | Nau .................... A61N 1/3702 600/510 |
| 6,085,244 A * | 7/2000 | Wookey .............. G06F 11/2294 709/223 |
| 6,266,528 B1 | 7/2001 | Farzaneh |
| 7,218,928 B2 | 5/2007 | Park et al. |
| 8,184,705 B2 * | 5/2012 | Lin ...................... H04N 19/139 348/402.1 |
| 8,488,746 B1 * | 7/2013 | Chang ................. H04L 43/0817 370/252 |
| 9,830,215 B1 * | 11/2017 | Mathew ................ G06F 11/079 |
| 2007/0183674 A1 * | 8/2007 | Lee ...................... H04N 19/124 382/238 |
| 2014/0122707 A1 | 5/2014 | de Assuncao et al. |
| 2014/0153418 A1 | 6/2014 | Hariharan et al. |
| 2014/0235179 A1 | 8/2014 | George et al. |
| 2014/0281737 A1 * | 9/2014 | Compann ............... H04L 41/32 714/46 |
| 2014/0350856 A1 * | 11/2014 | Lambie .................... G01W 1/00 702/3 |
| 2015/0289152 A1 * | 10/2015 | Shanmugam ......... H04W 24/06 455/425 |

\* cited by examiner

*Primary Examiner* — Rasheed Gidado (57) ABSTRACT

A method for collecting diagnostic data in a wireless communication network. The method comprises storing previously measured results of the diagnostic data for improving quality of the wireless communication network, determining a spatiotemporal correlation model based on the previously measured results of the diagnostic data in accordance with a data collection strategy, and collecting new diagnostic data based on the determined spatiotemporal correlation model and the data collection strategy.

20 Claims, 6 Drawing Sheets

FRAMEWORK FOR INTELLIGENT DIAGNOSTIC DATA COLLECTION

TECHNICAL FIELD

This disclosure relates generally to wireless communication systems. More specifically, this disclosure relates to a framework for intelligent diagnostic data collection.

BACKGROUND

A development of long term evolution (LTE) brings opportunities to both mobile carriers and device original equipment manufacturers (OEMs). Owing to an increased network capacity and throughput, many new technologies have been emerged. For example, a voice over LTE (VoLTE) technique transmitting voice calls through an LTE network provides salient advantages such as higher efficiency and global roaming. A VoLTE call may provide higher performance metrics than a legacy circuit switching (CS) call and a voice over internet protocol (VoIP) call. However, the reliability of the VoLTE call still lags behind that of the CS call and the VoIP call. Specifically, a call failure ratio including setup failures and unintended drop situations is almost 5 times higher than that of legacy calls (e.g., CS call and VoIP call). Such issues severely impair user experience. Therefore, diagnostic data needs to be collected to facilitate troubleshooting.

SUMMARY

This disclosure provides method and apparatus for intelligent diagnostic data collection in a wireless communication system.

In one embodiment, a network element for collecting diagnostic data in a wireless communication network is provided. The network element includes a memory storing previously measured results of the diagnostic data for improving quality of the wireless communication network. The network element further includes at least one processor operably connected to the memory, the at least one processor is configured to determine a spatiotemporal correlation model based on the previously measured results of the diagnostic data in accordance with a data collection strategy and collect new diagnostic data based on the determined spatiotemporal correlation model and the data collection strategy.

In another embodiment, a method for collecting diagnostic data in a wireless communication network is provided. The method comprises storing previously measured results of the diagnostic data for improving quality of the wireless communication network, determining a spatiotemporal correlation model based on the previously measured results of the diagnostic data in accordance with a data collection strategy, and collecting new diagnostic data based on the determined spatiotemporal correlation model and the data collection strategy.

In yet another embodiment, a non-transitory computer readable medium comprising program code is provided. When executed by at least one processor, the program code causes the at least one processor to store previously measured results of diagnostic data into a memory for improving quality of a wireless communication network, determine a spatiotemporal correlation model based on the previously measured results of the diagnostic data in accordance with a data collection strategy, and collect new diagnostic data based on the determined spatiotemporal correlation model and the data collection strategy.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The descriptions of FIGS. 1-4 are not meant to imply physical or architectural limitations to the manner in which different embodiments may be implemented. Different embodiments of the present disclosure may be implemented in any suitably-arranged communications system.

Figure 1:
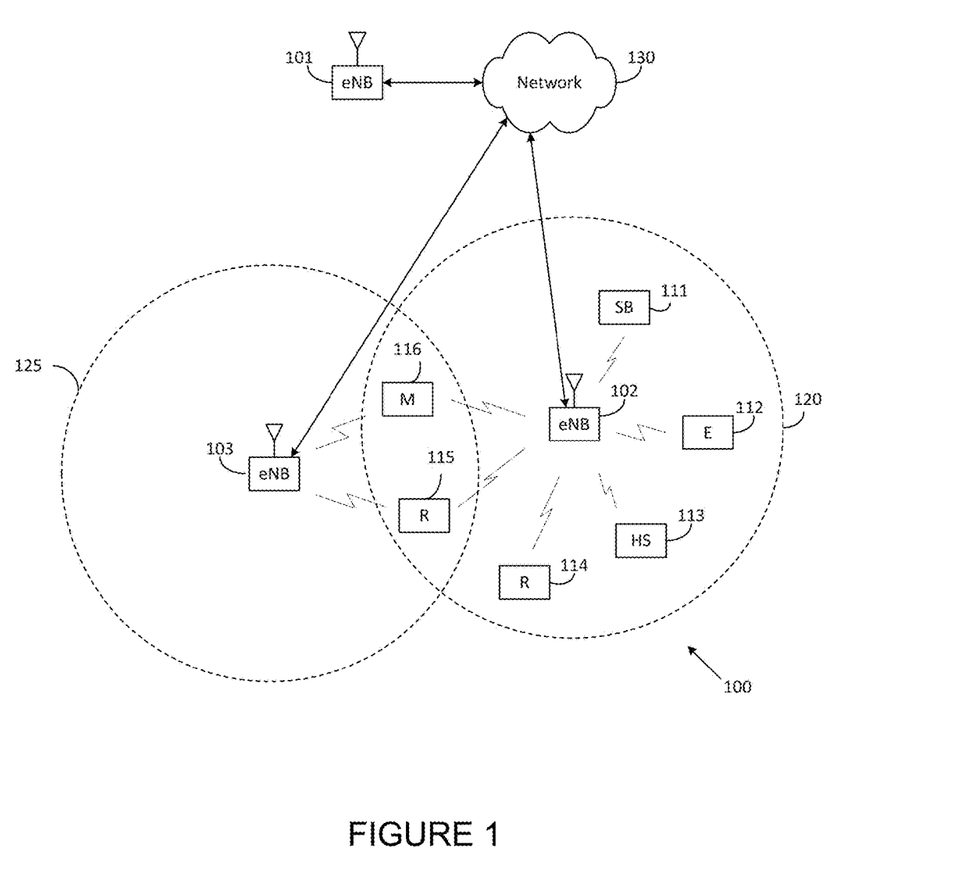
FIG. 1 illustrates an example wireless network according to various embodiments of the present disclosure.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U (LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for collecting diagnostic data in a wireless communication network. In certain embodiments, and one or more of the eNBs 101-103 includes circuitry, programming, or a combination thereof, for collecting diagnostic data in a wireless communication network.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
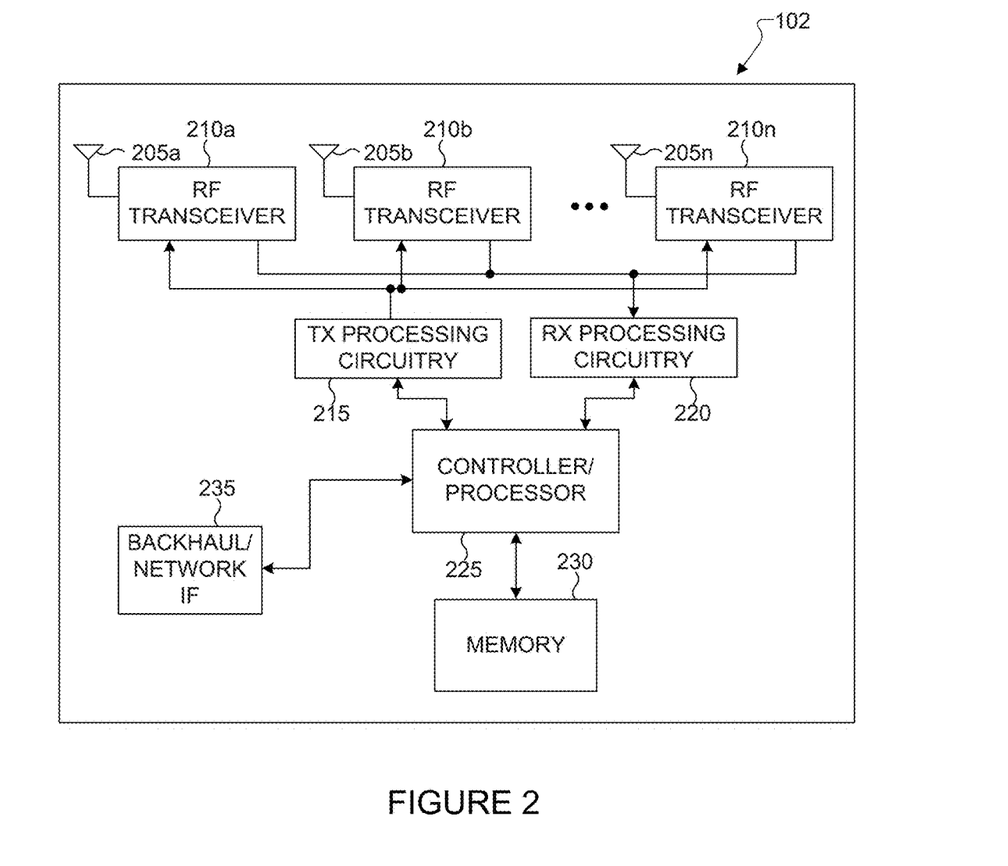
FIG. 2 illustrates an example eNodeB (eNB) according to various embodiments of the present disclosure.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

In some embodiments, the controller/processor 225 is configured to determine a spatiotemporal correlation model based on the previously measured results of the diagnostic data in accordance with a data collection strategy and collect new diagnostic data based on the determined spatiotemporal correlation model and the data collection strategy.

In some embodiments, the controller/processor 225 is configured to estimate unmeasured diagnostic data based on the determined spatiotemporal correlation model and the previously measured results of the diagnostic data and measure the new diagnostic data based on the data collection strategy.

In some embodiments, the controller/processor 225 is configured to update the spatiotemporal correlation model based on the collected new diagnostic data and recalculate the estimated unmeasured diagnostic data based on the updated spatiotemporal correlation model.

In some embodiments, the controller/processor 225 is configured to determine a collecting position and time associated with the new diagnostic data to optimize a granularity of the new diagnostic data based on at least one of estimated unmeasured diagnostic data, actual measurement data of the new diagnostic data, or a monitoring granularity and update the data collection strategy based on the collecting position and time associated with the new diagnostic data.

In some embodiments, the controller/processor 225 is configured to compare the estimated unmeasured diagnostic data, the actual measurement data of the new diagnostic data, and the monitoring granularity each other and collect the new diagnostic data based on an updated data collection strategy.

In such embodiments, the monitoring granularity comprises a scale based on a geographical area to collect the diagnostic data. In addition, the spatiotemporal correlation model comprises at least one of a spatial correlation model or a temporal correlation model.

In some embodiments, the controller/processor 225 is configured to a machine learning engine configured to estimate the new diagnostic data and update the spatiotemporal correlation model and a collection strategy controller configured to collect position and time information of the new diagnostic data for the data collection strategy.

As described in more detail below, the eNB 102 includes circuitry, programming, or a combination thereof for monitoring and learning context of VoLTE call. In some embodiments, the eNBs 102 includes a server to collecting diagnostic data in a wireless communication network.

For example, controller/processor 225 can be configured to execute one or more instructions, stored in memory 230, that are configured to collect diagnostic data in a wireless communication network The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U (LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM. In some embodiments, the memory 230 may store a program code, that when executed by at least one controller/processor 340, causes the at least one processor to store previously measured results of diagnostic data into a memory for improving quality of a wireless communication network, determine a spatiotemporal correlation model based on the previously measured results of the diagnostic data in accordance with a data collection strategy, and collect new diagnostic data based on the determined spatiotemporal correlation model and the data collection strategy.

In some embodiments, the memory 230 may store a program code, that when executed by at least one controller/processor 340, cause the at least one processor to estimate unmeasured diagnostic data based on the determined spatiotemporal correlation model and the previously measured results of the diagnostic data and measure the new diagnostic data based on the data collection strategy.

In some embodiments, the memory 230 may store a program code, that when executed by at least one controller/processor 340, cause the at least one processor to update the spatiotemporal correlation model based on the collected new diagnostic data and recalculate the estimated unmeasured diagnostic data based on the updated spatiotemporal correlation model.

In some embodiments, the memory 230 may store a program code, that when executed by at least one controller/processor 340, cause the at least one processor to determine a collecting position and time associated with the new diagnostic data to optimize a granularity of the new diagnostic data based on at least one of estimated unmeasured diagnostic data, actual measurement data of the new diagnostic data, or a monitoring granularity and update the data collection strategy based on the collecting position and time associated with the new diagnostic data.

In some embodiments, the memory 230 may store a program code, that when executed by at least one controller/processor 340, cause the at least one processor to compare the estimated unmeasured diagnostic data, the actual measurement data of the new diagnostic data, and the monitoring granularity each other and collect the new diagnostic data based on an updated data collection strategy.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
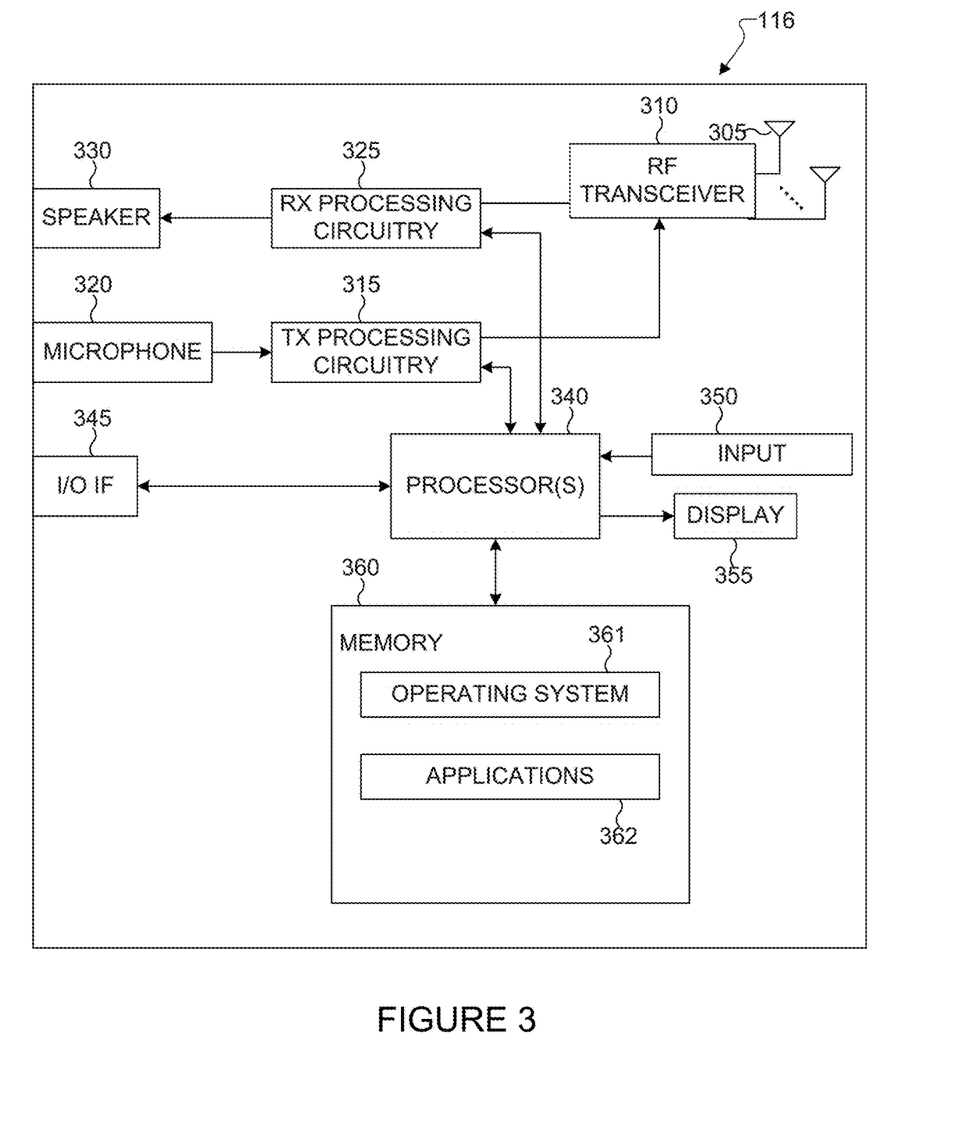
FIG. 3 illustrates an example user equipment (UE) according to various embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes a diagnostic data for the eNBs 101-103 in a wireless communication network.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites. In some embodiments, the processor 340 is configured to transmit diagnostic data to the eNBs 101-103 in a wireless communication network.

The memory 360 is coupled to the processor 340. Part of the memory 360 could include a random access memory (RAM), and another part of the memory 360 could include a Flash memory or other read-only memory (ROM). In some embodiments, the memory 360 may store a program code, that when executed by at least one controller/processor 340, causes the at least one processor to transmit diagnostic data to the eNBs 101-103 in a wireless communication network.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, only one antenna may be used in set of antennas 305. Also, while FIG. 3 illustrates the UE 116 configured as a mobile telephone or smartphone, UEs could be configured to operate as other types of mobile or stationary devices.

Figure 4:
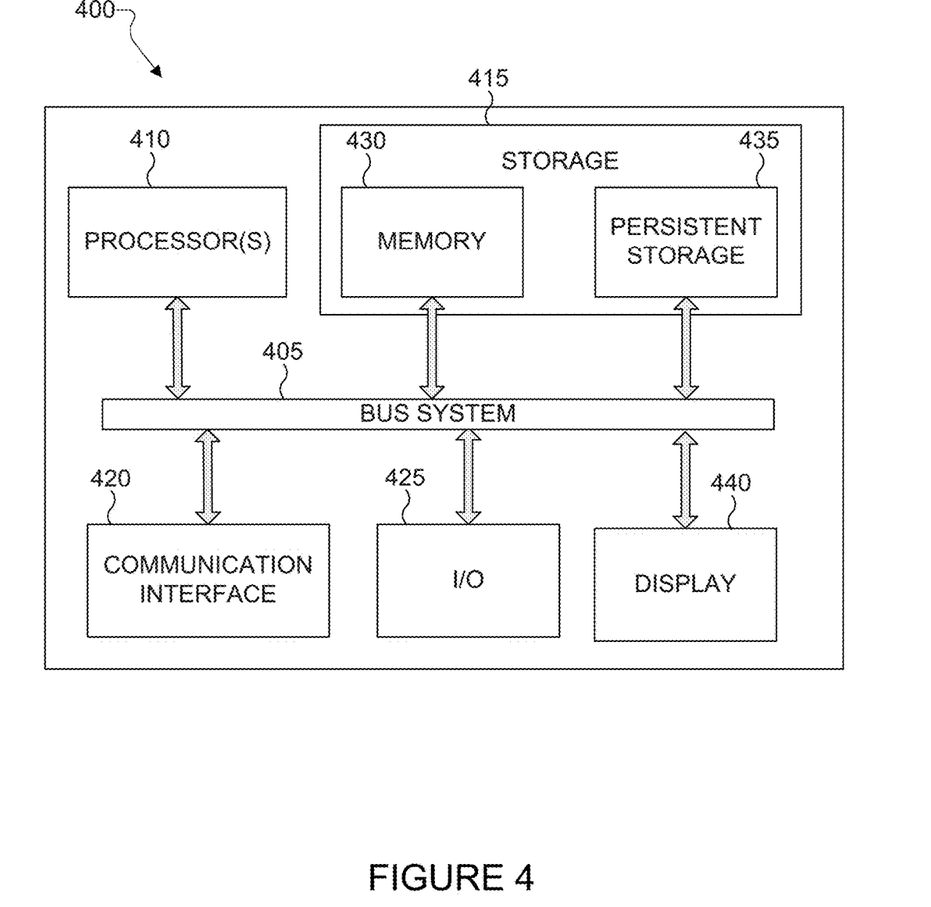
FIG. 4 illustrates an example server in a computing system according to various embodiments of the present disclosure.

FIG. 4 illustrates an example server 400 in a computing system according to embodiments of the present disclosure. As illustrated in FIG. 4, a server 400 could represent the eNBs 101, 102, 103 in FIG. 1. In one embodiment, the server 400 could be deployed as an internal that is installed in the eNBs 101, 102, 103. In another embodiment, the server 400 could be deployed as an external device for the eNBs 101, 102, 103. For example, the server 400 may be a network element that provides a framework for intelligent diagnostic data collection.

As shown in FIG. 4, the server 400 includes a bus system 405, which supports communication between at least one processor 410, at least one storage 415, at least one communication interface 420, at least one input/output (I/O) unit 425, and at least one display 440.

The processor 410 executes instructions that may be loaded into a memory 430. The processor 410 may include any suitable number(s) and type(s) of processors or other devices in any suitable arrangement. Example types of the processor 410 include microprocessors, microcontrollers, digital signal processors, field programmable gate arrays, application specific integrated circuits, discreet circuitry, and video stream processors.

In some embodiments, the processor 410 is configured to transmit determine a spatiotemporal correlation model based on the previously measured results of the diagnostic data in accordance with a data collection strategy and collect new diagnostic data based on the determined spatiotemporal correlation model and the data collection strategy.

In some embodiments, the processor 410 is configured to estimate unmeasured diagnostic data based on the determined spatiotemporal correlation model and the previously measured results of the diagnostic data and measure the new diagnostic data based on the data collection strategy.

In some embodiments, the processor 410 is configured to update the spatiotemporal correlation model based on the collected new diagnostic data and recalculate the estimated unmeasured diagnostic data based on the updated spatiotemporal correlation model.

In some embodiments, the processor 410 is configured to determine a collecting position and time associated with the new diagnostic data to optimize a granularity of the new diagnostic data based on at least one of estimated unmeasured diagnostic data, actual measurement data of the new diagnostic data, or a monitoring granularity and update the data collection strategy based on the collecting position and time associated with the new diagnostic data.

In some embodiments, the processor 410 is configured to compare the estimated unmeasured diagnostic data, the actual measurement data of the new diagnostic data, and the monitoring granularity each other and collect the new diagnostic data based on an updated data collection strategy. In such embodiments, the monitoring granularity comprises a scale based on a geographical area to collect the diagnostic data. In addition, the spatiotemporal correlation model comprises at least one of a spatial correlation model or a temporal correlation model.

In some embodiments, the processor 410 comprises a machine learning engine configured to estimate the new diagnostic data and update the spatiotemporal correlation model and a collection strategy controller configured to collect position and time information of the new diagnostic data for the data collection strategy.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, flash memory, or optical disc. The display 440 may include a panel, a hologram device, or a projector to display any object (such as a text, a video, an image, a graphic and/or other suitable information).

In some embodiments, the storage 415 store program code, that when executed by the at least one processor, causes the at least one processor to determine a spatiotemporal correlation model based on the previously measured results of the diagnostic data in accordance with a data collection strategy and collect new diagnostic data based on the determined spatiotemporal correlation model and the data collection strategy.

In some embodiments, the storage 415 stores program code, that when executed by the at least one processor, causes the at least one processor to estimate unmeasured diagnostic data based on the determined spatiotemporal correlation model and the previously measured results of the diagnostic data and measure the new diagnostic data based on the data collection strategy.

In some embodiments, the storage 415 stores program code, that when executed by the at least one processor, causes the at least one processor to update the spatiotemporal correlation model based on the collected new diagnostic data and recalculate the estimated unmeasured diagnostic data based on the updated spatiotemporal correlation model.

In some embodiments, the storage 415 stores program code, that when executed by the at least one processor, causes the at least one processor to determine a collecting position and time associated with the new diagnostic data to optimize a granularity of the new diagnostic data based on at least one of estimated unmeasured diagnostic data, actual measurement data of the new diagnostic data, or a monitoring granularity and update the data collection strategy based on the collecting position and time associated with the new diagnostic data.

In some embodiments, the storage 415 stores program code, that when executed by the at least one processor, causes the at least one processor to compare the estimated unmeasured diagnostic data, the actual measurement data of the new diagnostic data, and the monitoring granularity each other and collect the new diagnostic data based on an updated data collection strategy.

The communication interface 420 supports communications with other systems or devices. For example, the communication interface 420 could include a network interface card or a wireless transceiver facilitating communications over the network 100. The communication interface 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 400 of FIG. 4, the same or similar structure could be used in one or more of the eNB 101-103 as illustrated in FIG. 1. For example, a laptop or desktop computer could have the same or similar structure as that shown in FIG. 4. Any of these types of devices may implement the above discussed features of the server 400.

Diagnostic data in a communication network is informative to communication carriers and original equipment manufacturers (OEMs). Specifically, the diagnostic data can not only help carriers to identify issues like insufficient network coverage, but also assist the OEMs to troubleshoot hardware problems to reduce potential device return. Unfortunately, diagnostic data is now collected in an extremely ineffective and inefficient manner, which sometimes even negatively affects user experience. As a result, it is imperative to develop a framework that can intelligently collect diagnostic data of wireless communication network.

In order to troubleshoot issues aroused within a long-term evolution (LTE) network, carriers have developed various solutions to collect diagnostic data. However, the developed various solutions operate in an extremely ineffective and inefficient way, where diagnostic data is collected blindly from all mobile devices at a high frequency. Such designs for collecting diagnostic data may provide several drawbacks. In one example, blindly collecting diagnostic data imposes additional overhead on a network bandwidth. In another example, frequently collecting diagnostic data quickly drains the device battery. In yet another example, to process huge amount of diagnostic data, a troubleshooting process is performed with duplicate and drastically delays. In yet another example, the performance improvement resulted from growing data is actually quite limited.

Even worse, collecting diagnostic data can sometimes negatively impact user experience. For example, carriers are generally more concerned about LTE network coverage at places with higher population density. Therefore, diagnostic data, such as the strengths of radio frequency signals, are more frequently gathered from all devices in such places and fetched back to a carrier's central server. This collection process introduces additional but unnecessary overhead on a network bandwidth.

For example, there may be troubles with making phone calls at a very crowd stadium. Various reasons could contribute this unpleasant experience, for example, there are dead spaces of network coverage, or network saturation has occurred because the limited bandwidth cannot handle the overwhelming connection requests. Unfortunately, the situation deteriorates when carriers blindly collect diagnostic data from all devices or at a high frequency.

In some embodiments, diagnostic data in a wireless communication network is intelligently collected with a minimal impact on a network bandwidth while maintaining satisfied monitoring granularity by learning the spatiotemporal correlation model of the diagnostic data. In such embodiments, the diagnostic data is collected based on strength of radio frequency signal. In one embodiment, a spatial correlation may be used for intelligent diagnostic data collection at a given time instance. In such embodiment, two mobile devices that are spatially close to each other have similar strength of radio frequency signal. Therefore, an amount of diagnostic data collected from spatially close devices at a given time instance may be reduced, as the skipped measurements provide limited information. In another embodiment, a temporal correlation may be used for intelligent diagnostic data collection at a fixed position. In such embodiment, strength of radio frequency signal may not change much during a short period of time. Therefore, an amount of diagnostic data collected from one device during a short period of time may be reduced, as the skipped measurements provide limited information.

As a result, an amount of overhead on the network bandwidth may be reduced by reducing an amount of less informative diagnostic data. Moreover, by learning the spatial and temporal correlation, the skipped measurements with high confidence may be estimated such that satisfied monitoring granularity is maintained.

In some embodiments, an intelligent diagnostic data collection framework may comprise a monitoring granularity. In such embodiments, the monitoring granularity characterizes a scale at which diagnostic data may be collected. For example, carriers want to obtain the strength map/contour of radio frequency signals in a stadium, and the monitoring granularity can be an area in which all radio frequency signals can be measured by the same strength measurement or the density of contour lines.

In some embodiments, an intelligent diagnostic data collection framework may comprise a machine learning engine. In such embodiment, the machine learning engine learns a spatiotemporal correlation model of the diagnostic data. Specifically, the machine learning engine quantifies how diagnostic data collected at different positions and/or different time is correlated. This machine learning engine learns the correlation model through machine learning algorithms. Once the correlation model is obtained, the skipped measurements of diagnostic data may be estimated with high confidence. Moreover, the machine learning engine features an online updating loop. The spatiotemporal correlation model is initially trained using historical diagnostic data and may keep updating when new diagnostic data is available. In such embodiment, the spatiotemporal correlation model can adapt to dynamics of environments.

In some embodiments, an intelligent diagnostic data collection framework may comprise a collection strategy controller. The collection strategy controller decides the most informative positions and time (referred to as collection strategy) to collect new diagnostic data based on a correlation model. The selected positions and time collect measurements of diagnostic data, and it is used to predict measurements at other positions and time with high confidence. The determination of collection strategy is guided by information metrics such as fisher information and mutual information.

In some embodiments, an intelligent diagnostic data collection framework may comprise troubleshooting and diagnostics techniques. The troubleshooting and diagnostic techniques may use the collected and estimated diagnostic data to quickly identify issues of wireless communication network and mobile devices, and reduce potential device returns.

Figure 5:
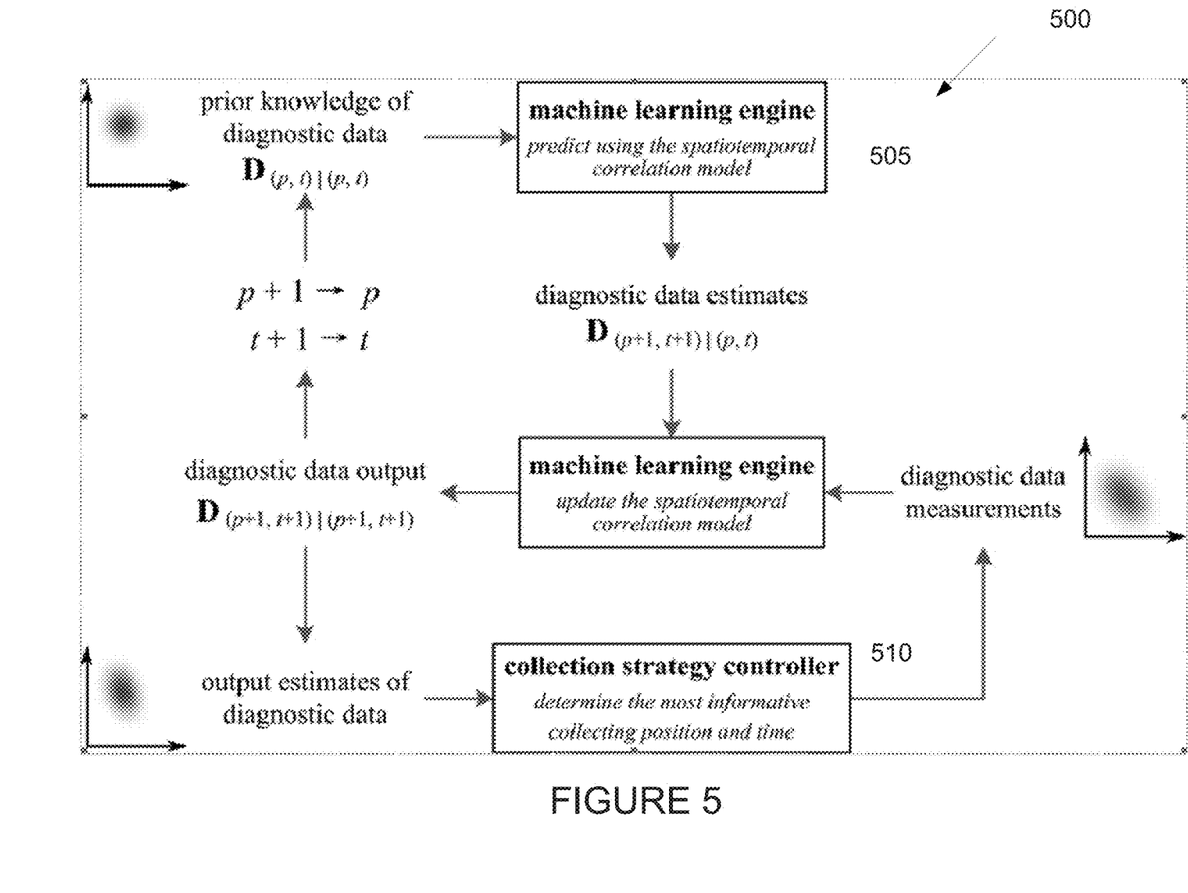
FIG. 5 illustrates an example pipeline of intelligent diagnostic data collection according to various embodiments of the present disclosure.

FIG. 5 illustrates an example pipeline of intelligent diagnostic data collection 500 according to various embodiments of the present disclosure. The embodiment of the pipeline of intelligent diagnostic data collection 500 shown in FIG. 5 is for illustration only. Other embodiments of the pipeline of intelligent diagnostic data collection 500 could be used without departing from the scope of this disclosure. As shown in FIG. 5, the pipeline of intelligent diagnostic data collection 500 comprises a machine learning engine 505, and a collection strategy controller 510.

FIG. 5 illustrates how the diagnostic data is collected in one round. However, the intelligent diagnostic data collection may be repeated until the required monitoring granularity is achieved. In the beginning of a round, historical measurements of diagnostic data may be treated as prior knowledge. The machine learning engine 505 predicts the unmeasured diagnostic data using a current spatiotemporal correlation model and historical measurements of diagnostic data. And the machine learning engine 505 updates the spatiotemporal correlation model. More specifically, new measurements of diagnostic data are collected using a collection strategy.

In one example, the machine learning engine 505 first updates the spatiotemporal correlation model based on the new measurements of diagnostic data, and then re-calculates the estimates of unmeasured diagnostic data based on the updated spatiotemporal correlation model.

In another example, the collection strategy controller 510 compares the estimates of unmeasured diagnostic data, actual measurements of the unmeasured diagnostic data, and the required monitoring granularity, based on which the collection strategy controller 510 determines the next collection strategy to collect the most informative position and time.

Figure 6:
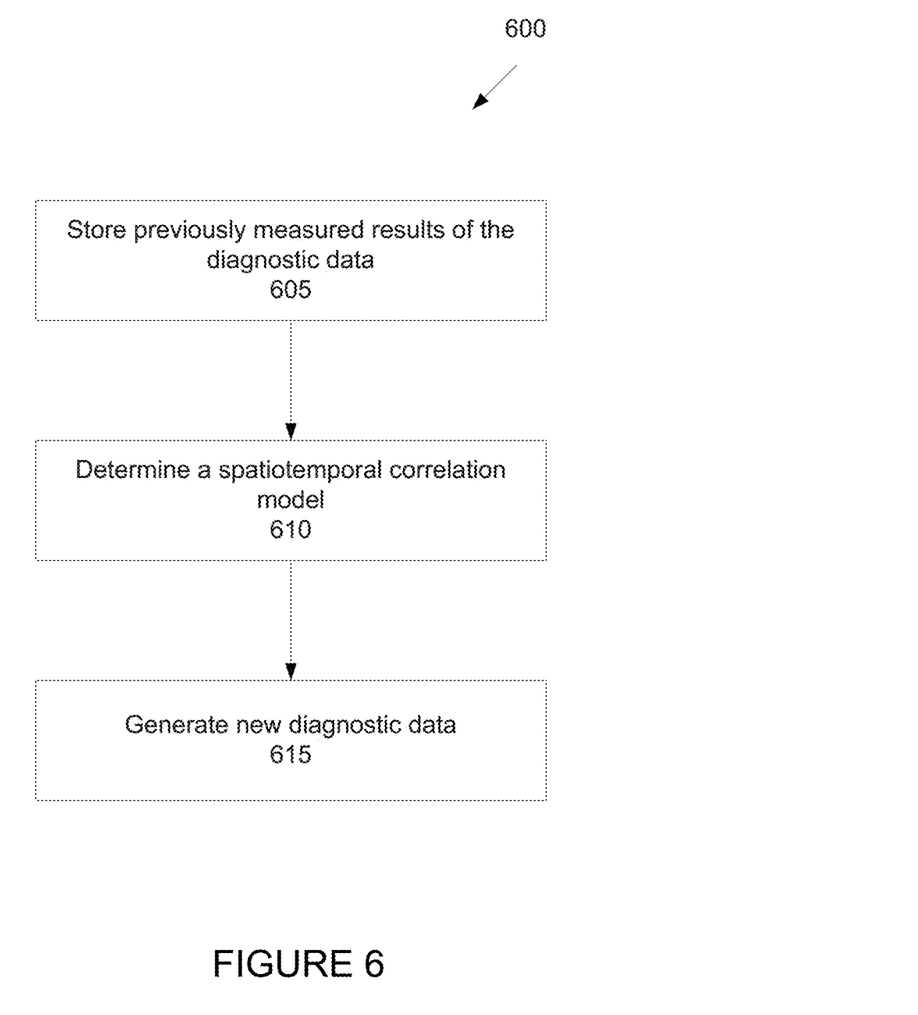
FIG. 6 illustrates an example flowchart according to various embodiments of the present disclosure.

FIG. 6 illustrates an example flowchart 600 according to various embodiments of the present disclosure, as may be performed by a network element, for example, the server 400 in FIG. 4. The embodiment of the flowchart 600 shown in FIG. 6 is for illustration only. Other embodiments of the flowchart 600 could be used without departing from the scope of this disclosure.

As shown in FIG. 6, the network element stores, at step 605, previously measured results of the diagnostic data for improving quality of the wireless communication network. Subsequently, the network element determines, at step 610, a spatiotemporal correlation model based on the previously measured results of the diagnostic data in accordance with a data collection strategy. Wherein the spatiotemporal correlation model comprises at least one of a spatial correlation model or a temporal correlation model. More specifically, at step 610, the network element estimates unmeasured diagnostic data based on the determined spatiotemporal correlation model and the previously measured results of the diagnostic data and measures the new diagnostic data based on the data collection strategy. In addition, the network element, at step 610, update the spatiotemporal correlation model based on the collected new diagnostic data and recalculate the estimated unmeasured diagnostic data based on the updated spatiotemporal correlation model.

Finally, the network element collects, at step 615, new diagnostic data based on the determined spatiotemporal correlation model and the data collection strategy. In addition, the network element, at step 615, determine a collecting position and time associated with the new diagnostic data to optimize a granularity of the new diagnostic data based on at least one of estimated unmeasured diagnostic data, actual measurement data of the new diagnostic data, or a monitoring granularity, and update the data collection strategy based on the collecting position and time associated with the new diagnostic data. Further, the network element, at step 615, compare the estimated unmeasured diagnostic data, the actual measurement data of the new diagnostic data, and the monitoring granularity each other, and collect the new diagnostic data based on an updated data collection strategy. At step 615, the monitoring granularity comprises a scale based on a geographical area to collect the diagnostic data.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A network element for collecting diagnostic data in a wireless communication network, the network element comprising:
   a memory configured to store previously measured results of the diagnostic data for improving quality of wireless communications in the wireless communication network; and
   at least one processor operably connected to the memory, the at least one processor configured to:
      identify spatiotemporal correlations based on a spatiotemporal correlation model derived from the previously measured results of the diagnostic data in accordance with a data collection strategy that indicates particular position and time of collection of the diagnostic data associated with the wireless communications; and
      collect new diagnostic data based on the spatiotemporal correlation model and the data collection strategy.

2. The network element of claim 1, wherein the at least one processor is further configured to:
   estimate unmeasured diagnostic data based on the spatiotemporal correlation model and the previously measured results of the diagnostic data; and
   measure the new diagnostic data based on the data collection strategy.

3. The network element of claim 2, wherein the at least one processor is further configured to:
   update the spatiotemporal correlation model based on the collected new diagnostic data; and
   recalculate the estimated unmeasured diagnostic data based on the updated spatiotemporal correlation model.

4. The network element of claim 1, wherein the at least one processor is further configured to:
   determine a collecting position and time associated with the new diagnostic data to optimize a granularity of the new diagnostic data based on at least one of estimated unmeasured diagnostic data, actual measurement data of the new diagnostic data, or a monitoring granularity; and
   update the data collection strategy based on the collecting position and time associated with the new diagnostic data.

5. The network element of claim 4, wherein the at least one processor is further configured to:
   compare the estimated unmeasured diagnostic data, the actual measurement data of the new diagnostic data, and the monitoring granularity each other; and
   collect the new diagnostic data based on an updated data collection strategy.

6. The network element of claim 5, wherein the monitoring granularity comprises a scale based on a geographical area to collect the diagnostic data.

7. The network element of claim 1, wherein the spatiotemporal correlation model comprises at least one of a spatial correlation model or a temporal correlation model.

8. The network element of claim 1, wherein the at least one processor comprises:
   a machine learning engine configured to estimate the new diagnostic data and update the spatiotemporal correlation model; and
   a collection strategy controller configured to collect position and time information of the new diagnostic data for the data collection strategy.

9. A method for collecting diagnostic data in a wireless communication network, the method comprising:
   storing previously measured results of the diagnostic data for improving quality of wireless communications in the wireless communication network; and
   identifying spatiotemporal correlations based on a spatiotemporal correlation model derived from the previously measured results of the diagnostic data in accordance with a data collection strategy that indicates particular position and time of collection of the diagnostic data associated with the wireless communications; and
   collecting new diagnostic data based on the spatiotemporal correlation model and the data collection strategy.

10. The method of claim 9, further comprising:
    estimating unmeasured diagnostic data based on the spatiotemporal correlation model and the previously measured results of the diagnostic data; and
    measuring the new diagnostic data based on the data collection strategy.

11. The method of claim 10, further comprising:
    updating the spatiotemporal correlation model based on the collected new diagnostic data; and recalculating the estimated unmeasured diagnostic data based on the updated spatiotemporal correlation model.

12. The method of claim 9, further comprising:

determining a collecting position and time associated with the new diagnostic data to optimize a granularity of the new diagnostic data based on at least one of estimated unmeasured diagnostic data, actual measurement data of the new diagnostic data, or a monitoring granularity; and updating the data collection strategy based on the collecting position and time associated with the new diagnostic data.

13. The method of claim 12, further comprising:

comparing the estimated unmeasured diagnostic data, the actual measurement data of the new diagnostic data, and the monitoring granularity each other; and collecting the new diagnostic data based on an updated data collection strategy.

14. The method of claim 13, wherein the monitoring granularity comprises a scale based on a geographical area to collect the diagnostic data.

15. The method of claim 9, wherein the spatiotemporal correlation model comprises at least one of a spatial correlation model or a temporal correlation model.

16. A non-transitory computer readable medium comprising program code, that when executed by at least one processor, causes the at least one processor to:

store previously measured results of diagnostic data into a memory for improving quality of wireless communications in a wireless communication network;

identify spatiotemporal correlations based on a spatiotemporal correlation model derived from the previously measured results of the diagnostic data in accordance with a data collection strategy that indicates particular position and time of collection of the diagnostic data associated with the wireless communications; and collect new diagnostic data based on the spatiotemporal correlation model and the data collection strategy.

17. The non-transitory computer readable medium of claim 16, further comprising program code, that when executed by the at least one processor, causes the at least one processor to:

estimate unmeasured diagnostic data based on the spatiotemporal correlation model and the previously measured results of the diagnostic data; and measure the new diagnostic data based on the data collection strategy.

18. The non-transitory computer readable medium of claim 17, further comprising program code, that when executed by the at least one processor, causes the at least one processor to:

update the spatiotemporal correlation model based on the collected new diagnostic data; and recalculate the estimated unmeasured diagnostic data based on the updated spatiotemporal correlation model.

19. The non-transitory computer readable medium of claim 16, further comprising program code, that when executed by the at least one processor, causes the at least one processor to:

determine a collecting position and time associated with the new diagnostic data to optimize a granularity of the new diagnostic data based on at least one of estimated unmeasured diagnostic data, actual measurement data of the new diagnostic data, or a monitoring granularity; and update the data collection strategy based on the collecting position and time associated with the new diagnostic data.

20. The non-transitory computer readable medium of claim 19, further comprising program code, that when executed by the at least one processor, causes the at least one processor to:

compare the estimated unmeasured diagnostic data, the actual measurement data of the new diagnostic data, and the monitoring granularity each other; and collect the new diagnostic data based on an updated data collection strategy.

* * * * *